(No Model.)
F. HUMMEL, Sr.
Breech Loading Fire Arm.
No. 235,771.    Patented Dec. 21, 1880.
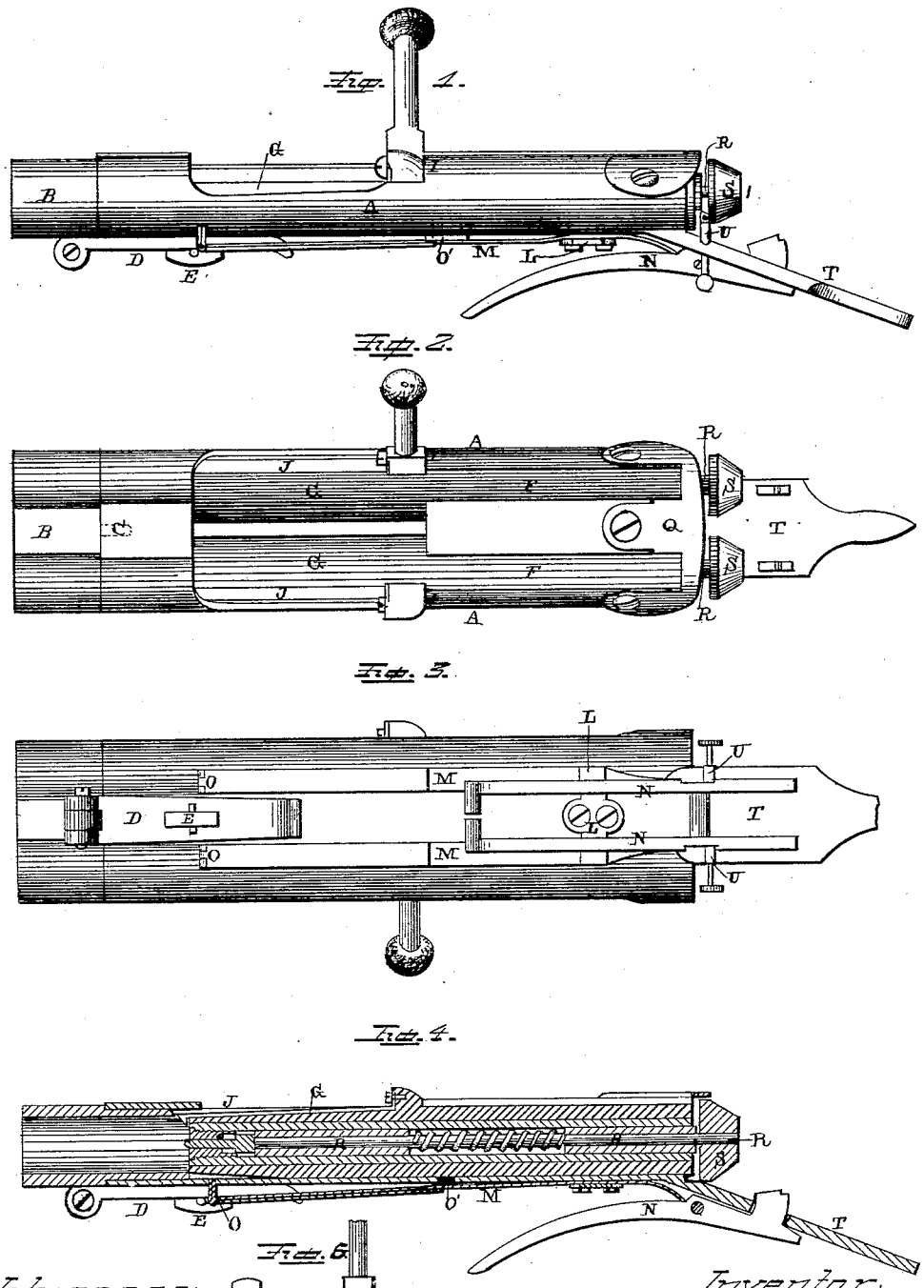
Witnesses:
W. W. Mortimer,
W. H. Kern.
Inventor:
F. Hummel, Sr.,
per
F. A. Lehmann,
Atty.

UNITED STATES PATENT OFFICE.

FERDINAND HUMMEL, SR., OF PADUCAH, KENTUCKY.

BREECH-LOADING FIRE-ARM.

SPECIFICATION forming part of Letters Patent No. 235,771, dated December 21, 1880.

Application filed May 27, 1880. (No model.)

*To all whom it may concern:*

Be it known that I, FERDINAND HUMMEL, Sr., of Paducah, in the county of McCracken and State of Kentucky, have invented certain new and useful Improvements in Breech-Loading Guns and Cannons; and I do hereby declare the following to be a full, clear, and exact description of the invention, such as will enable others skilled in the art to which it pertains to make and use it, reference being had to the accompanying drawings, which form part of this specification.

My invention relates to an improvement in breech-loading guns and cannons of all kinds; and it consists in fastening together the two bolts, so that they are moved and turned by the same handle at the same time.

It further consists in providing the bolts with cogs upon their rear ends, which cogs serve not only for the purpose of connecting the two bolts together, but causing them to turn in opposite directions.

It further consists in operating the cartridge-extractors by means of springs which have projections extending through the under side of the frame, and which projections catch in tapering grooves in the under sides of the bolts, so that as the bolts are drawn backward the cartridge-extractors rise upward, and as the bolts are pushed forward they are depressed.

It further consists in the arrangement and combination of parts, as will be more fully described hereinafter, whereby a very cheap, simple, and effective breech-loader is produced.

Figure 1 is a side elevation of my invention. Fig. 2 is a plan view of the same. Fig. 3 is an inverted view. Fig. 4 is a vertical section taken through one of the bolts. Figs. 5 and 6 are detail views.

A represents the frame, and B the barrels. The rear ends of these barrels are reduced in size, so as to enter the front end of the frame, and the barrels are also provided with a horizontal pin, C, which projects into a hole made in the front end of the frame to receive it, and thus assists in keeping the barrels rigidly in position. Upon the under side of these barrels is formed a projection, to which the clasp D is pivoted, which clasp extends horizontally backward and catches over the lower end of the projection E, formed on the under side of the frame A. A pin is passed through this projection on the under side of the clasp, so as to hold the barrels securely in place. The rear edges of the barrels are beveled away, so that the cartridge-extractors can catch over the edges of the shells for the purpose of withdrawing them, and in the rear ends of the barrels are formed recesses, into which the flanges on the cartridges fit.

The frame A is open at its top for sufficient distance to allow a cartridge of sufficient size to be inserted into either one of the barrels, and extending back from this opening are the slots F, through which the lever or handle attached to one firing-bolt and a stud or projection upon the other bolt move. These two bolts G, although intended for two different barrels, do not move separately, but are connected together at their rear ends by means of the cogs H, which cogs not only unite the two bolts together, but cause them to turn in opposite directions when the right hand one is moved by means of its lever. The cogs on one of the barrels have a flange at each of their ends, which flanges form stops for the other set of cogs which catch in between them. By means of these flanges on one set of cogs the two bolts are held together in such a manner that when one is moved endwise the other must move also. When these two bolts are moved backward the full length of the slots, the frame is opened for the insertion of cartridges into the barrels; but when the bolts are moved forward until the lever attached to one and the stud or projection attached to the other passes beyond the shoulder I, the cartridge is pushed into position ready to be fired. By moving the lever attached to one of the bolts it will catch behind its shoulder, and this bolt, in turning, will turn the other bolt by means of the cogs, so that its projection will catch behind the shoulder in the same manner. In this way both of the bolts are locked rigidly in position, so that it is impossible for the cartridge to give in the slightest degree. Each of these bolts is provided with a cartridge-extractor, J, in the usual manner, so that when the bolts are drawn backward the cartridge will be withdrawn from the barrel.

Secured to the under side of the frame by means of a cross-plate, L, are the two springs M, which have their rear ends to bear against the upper sides of the sears N, and to their front ends are attached the cartridge-supporters O, which project up through the slots in the bottom of the frame, so as to throw out the shell as the bolts are drawn backward. Near the center of these springs are formed suitable projections, O', which extend upward through slots in the frame and catch in beveled grooves made in the front ends of the bolts. As the bolts are moved forward these beveled grooves in the under sides of the bolts cause these projections on the springs to be forced downward, and these springs force downward the cartridge-supporters at the same time, so that as the bolts are forced forward the supporters are drawn downward by the springs, so as to be entirely out of the way. As the bolts are drawn backward the projections on the springs rise upward into these grooves in the front ends of the bolts, and then allow the supporters to rise upward just in time to throw out the shells.

Secured across the rear end of the frame is a plate, Q, which forms the rear ends of the slots in the ends of the frame and the stop against which the handle and projection on the bolts strike. As long as the plate is in position the bolts cannot be removed; but when the plate is taken off both bolts can be moved backward entirely out of the frame. In each of these bolts is placed a firing-pin, R, by means of which the cartridges are discharged. Each of these bolts has a large button or wheel, S, upon its rear end, which buttons or wheels, as the two bolts are being forced forward, catch upon the sears, so as to prevent them being forced forward with the bolts. In the bolts are placed suitable springs, which, as soon as either one of the wheels or buttons is released, by pressing upward upon the sears, instantly force forward the rod with such force as to explode the cartridge.

Passing horizontally through the plate T, which is secured to the top of the front end of the stock, are the two vertically-moving safety firing-pins U, which are provided with springs to hold them in any desired position. When these pins, or either one of them, are moved upward, they catch in between the end of the bolt and the button or wheel on the firing-pin, so as to prevent the pin from moving sufficiently far forward to explode the cartridge. While these pins are pressed upward neither barrel can be accidentally discharged.

Having thus described my invention, I claim—

1. In a breech-loader, the combination of the two bolts, which are connected together by means of cogs, so as to rotate in opposite directions, whereby their projections are made to catch behind the shoulders I, for the purpose of locking them in position, substantially as set forth.

2. The combination of the two bolts G, provided with the cogs H on their rear ends, one of the sets of cogs having flanges on its ends, so as to prevent the other set of cogs from becoming separated from it, whereby the two bolts are made to reciprocate together and turn in opposite directions, substantially as described.

In testimony that I claim the foregoing I have hereunto set my hand this 13th day of May, 1880.

FERDINAND HUMMEL, SR.

Witnesses:
 JNO. A. MILLER,
 FERDINAND ELMER.